US012661288B2

(12) United States Patent
Lin et al.

(10) Patent No.: US 12,661,288 B2
(45) Date of Patent: Jun. 23, 2026

(54) AIR MATTRESS SYSTEM WITH ALTERNATING AND BODY TURNING FUNCTIONS

(71) Applicant: Wellell Inc., New Taipei City (TW)

(72) Inventors: Sheng-Wei Lin, New Taipei City (TW); Yen-Chieh Chen, New Taipei City (TW); Yu-Hao Chen, New Taipei City (TW); Hsiao-Ya Huang, New Taipei City (TW); Chia-Hui Fang, New Taipei City (TW); Bo-Tai Chen, New Taipei City (TW)

(73) Assignee: WELLELL INC., New Taipei City (TW)

( * ) Notice: Subject to any disclaimer, the term of this patent is extended or adjusted under 35 U.S.C. 154(b) by 30 days.

(21) Appl. No.: 18/797,135

(22) Filed: Aug. 7, 2024

(65) Prior Publication Data

US 2025/0332048 A1 Oct. 30, 2025

(30) Foreign Application Priority Data

Apr. 30, 2024 (TW) ................................ 113116145

(51) Int. Cl.
*A61G 7/057* (2006.01)
*A61G 7/00* (2006.01)
*A47C 27/08* (2006.01)

(52) U.S. Cl.
CPC ......... *A61G 7/05776* (2013.01); *A61G 7/001* (2013.01); *A47C 27/082* (2013.01)

(58) Field of Classification Search
CPC .. A61G 7/05776; A61G 7/001; A61G 7/0525; A47C 27/082
(Continued)

(56) References Cited

U.S. PATENT DOCUMENTS 6,240,584 B1 * 6/2001 Perez .................. A47C 27/082 5/713
7,155,766 B1 1/2007 Gilchrest, Jr. et al.
(Continued)

*Primary Examiner* — David R Hare
*Assistant Examiner* — Joseane E. Tejada
(74) *Attorney, Agent, or Firm* — WPAT, PC

(57) ABSTRACT

The present invention discloses an air mattress system including a first protection cell group disposed on one side of a support cell group. The first protection cell group includes a first middle cell having a height not exceeding a support surface, so as to preserve smooth routing paths for medical treatment pipelines and prevent obstructed flow of fluids. A front and a rear of the first protection cell group are respectively provided with a first front cell and a first rear cell, both of which are provided with bottom air chambers. When a patient needs to be transferred, the bottom air chambers are controlled to be deflated so that tops of the first front cell and the first rear cell are substantially lowered to be near the support surface to provide the patient with an unobstructed transition during the transfer. When the height of the first protection cell group needs to be restored, only the bottom air chambers need to be inflated and a bed height suitable for a patient to lay on can be quickly restored. The present invention attends to requirements of both smooth pipeline routings and ease of transfer for a patient, hence improving practicability and quality of care of the air mattress system.

12 Claims, 8 Drawing Sheets

(58) Field of Classification Search
USPC ........................................................ 5/715, 713
See application file for complete search history.

(56) References Cited

U.S. PATENT DOCUMENTS

| | | | | |
|---|---|---|---|---|
| 2006/0085919 | A1 * | 4/2006 | Kramer .............. | A61G 7/05776 5/713 |
| 2008/0271245 | A1 * | 11/2008 | Flick .................. | A61G 7/05792 5/713 |
| 2014/0173825 | A1 | 6/2014 | Chiang et al. | |
| 2014/0283308 | A1 * | 9/2014 | Chen .................... | A61H 31/008 5/699 |
| 2020/0078241 | A1 | 3/2020 | Chang et al. | |

* cited by examiner

AIR MATTRESS SYSTEM WITH ALTERNATING AND BODY TURNING FUNCTIONS

BACKGROUND OF THE INVENTION

Field of the Invention

The present invention relates to an air mattress system, and more particularly to an air mattress system having alternating and body turning functions.

Description of the Prior Art

A conventional air mattress usually consists of multiple inflatable air cells to support the body of a patient. These air cells are typically arranged in a matrix to form a flat support surface for a patient to lay on.

To prevent a patient from rolling off an edge of a bed while turning, certain air mattresses are provided with higher soft cushions along edges of the bed. However, a patient on an air mattress often requires various medical tubes, such as infusion tubes and drainage tubes. The height of the cushions can cause obstacles in a way that the tubes are subject to significant height differences between the surface of the bed and the cushions and hence obvious bends, resulting in risks of poor flow or even backflow of fluids.

Some air mattresses are provided with conventional inflatable edge protection air cells on both sides. However, once the air mattresses have completed an initial inflation stage, the height of such conventional edge protection air cells cannot be immediately or quickly adjusted. In addition, such conventional edge protection air cells extend in a fixed height along two sides of the air mattresses, thus failing to simultaneously address both the need to prevent a patient from rolling off and the need to avoid undulation in the height of the medical tubes.

SUMMARY OF THE INVENTION

It is an objective of the present invention to provide a patient with edge protection while ensuring moderate placement of drainage tubes for the patient to allow smooth flow of fluids in the tubes.

It is another objective of the present invention to provide a smooth and unobstructed transition when a patient needs to be transferred or exit a bed without having to cross over a high edge protection structure, thereby enhancing convenience and reducing the burden of a caregiver.

To achieve the above and other objectives, the present invention provides an air mattress having alternating and body turning functions, the air mattress system is operable to be in fluid communication with an external air supply source and includes a bottom cover, a support cell group and a first protection cell group. The bottom cover has a bottom surface. The support cell group is disposed on the bottom surface, and includes a plurality of air cells collectively defining a support surface for a patient to lay on. The first protection cell group is disposed on the bottom surface and located on one side of the support cell group, and includes a first front cell, a first middle cell and a first rear cell. The first middle cell is arranged between the first front cell and the first rear cell, and has a height substantially not greater than a distance between the support surface and the bottom surface. Each of the first front cell and the first rear cell has a bottom air chamber close to the bottom surface, the bottom air chambers are in direct fluid communication with each other. When the bottom air chambers of the first front cell and the first rear cell are deflated, tops of the first front cell and the first rear cell are substantially lowered to be near the support surface.

According to some embodiments of the present invention, a first deflation knob is further included. The first deflation knob has a first deflation path for the bottom air chambers of the first front cell and the first rear cell to simultaneously deflate.

According to some embodiments of the present invention, each of the first front cell and the first rear cell has a top air chamber located over the bottom air chamber.

According to some embodiments of the present invention, the first middle cell, the top air chamber of the first front cell and the top air chamber of the first rear cell are connected in series and are in fluid communication with each other.

According to some embodiments of the present invention, the support cell group includes a plurality of head-region air cells, a plurality of first alternating air cells and a plurality of second alternating air cells. The first alternating air cells and the second alternating air cells are arranged alternately. The head-region air cells are in fluid communication with the top air chamber of the first front cell via an air supplement tube, wherein the top air chamber of the first front cell is operable to receive air from the support cell group via the air supplement tube.

According to some embodiments of the present invention, the first alternating air cells are in fluid communication with a first tube for inflation/deflation control, the second alternating air cells are in fluid communication with a second tube for inflation/deflation control, and each of the head-region air cells is separately in fluid communication with the first tube and the second tube via a one-way valve so as to receive air from the first alternating air cells and the second alternating air cells.

According to some embodiments of the present invention, a second protection cell group is further included. The second protection cell group is disposed on the bottom surface and is located on the other side of the support cell group. The second protection cell group includes a second front cell, a second middle cell and a second rear cell. The second middle cell is arranged between the second front cell and the second rear cell, and has a height substantially not greater than the distance between the support surface and the bottom surface. Each of the second front cell and the second rear cell has a bottom air chamber close to the bottom surface and a top air chamber located above the bottom air chamber, and the bottom air chambers of the second front cell and the second rear cell are in direct fluid communication with each other. When the bottom air chambers of the second front cell and the second rear cell are controlled and deflated, tops of the second front cell and the second rear cell are substantially lowered to be near the support surface. The top air chamber of the second front cell is in fluid communication with the air supplement tube.

According to some embodiments of the present invention, the second middle cell, the top air chamber of the second front cell and the top air chamber of the second rear cell are connected in series and are in fluid communication with each other.

According to some embodiments of the present invention, a third tube and a first bridge tube are further included. The third tube is in fluid communication with the bottom air chamber of the second rear cell, the bottom air chamber of the first rear cell and the first deflation knob. The first bridge tube is in fluid communication with the top air chamber of the first rear cell and the first deflation knob, and is selectively in fluid communication with the bottom air chamber and the top air chamber of the first rear cell via the first deflation knob. The first deflation knob has a first mode and a second mode. When the first deflation knob is switched to the first mode, the bottom air chamber of the first front cell, the bottom air chamber of the first rear cell, the bottom air chamber of the second front cell and the bottom air chamber of the second rear cell are together in fluid communication with the first deflation path and are deflated. When the first deflation knob is switched to the second mode, the bottom air chamber of the first rear cell is in fluid communication with the top air chamber of the first rear cell via the first bridge tube, and the bottom air chamber of the first rear cell receives air from the air supply source and receives air from the support cell group via the air supplement tube.

According to some embodiments of the present invention, a second deflation knob is further included. The second deflation knob has a second deflation path for the bottom air chamber of the second front cell and the bottom air chamber of the second rear cell to simultaneously deflate.

According to some embodiments of the present invention, a first bridge tube and a second bridge tube are further included. The first bridge tube is in fluid communication with the top air chamber of the first rear cell and the first deflation knob, and is selectively in fluid communication with the bottom air chamber of the first rear cell via the first deflation knob. The second bridge tube is in fluid communication with the top air chamber of the second rear cell and the second deflation knob, and is selectively in fluid communication with the bottom air chamber of the second rear cell via the second deflation knob. The air supplement tube is further in fluid communication with the top air chamber of the second front cell, so that the top air chamber of the second front cell receives air from the support cell group via the air supplement tube. The first deflation knob has a first mode and a second mode. When the first deflation knob is switched to the first mode, the bottom air chambers of the first front cell and the first rear cell are in fluid communication with the first deflation path to undergo deflation, and are isolated from the top air chamber of the first front cell. When the first deflation knob is switched to the second mode, the bottom air chamber of the first rear cell is in fluid communication with the top air chamber of the first rear cell via the first bridge tube, and the bottom air chamber of the first rear cell receives air from the air supply source and receives air from the support cell group via the air supplement tube.

According to some embodiments of the present invention, a second deflation knob is further included. The second deflation knob has a second deflation path for the bottom air chambers of the second front cell and the second rear cell to simultaneously deflate.

According to some embodiments of the present invention, a first bridge tube and a second bridge tube are further included. The first bridge tube is in fluid communication with the top air chamber of the first rear cell and the first deflation knob, and is selectively in fluid communication with the bottom air chamber of the first rear cell via the first deflation knob. The second bridge tube is in fluid communication with the top air chamber of the second rear cell and the second deflation knob, and is selectively in fluid communication with the bottom air chamber of the second rear cell via the second deflation knob. The air supplement tube is further in fluid communication with the top air chamber of the second front cell, such that the top air chamber of the second front cell receives air from the support cell group via the air supplement tube. The first deflation knob has a first mode and a second mode. When the first deflation knob is switched to the first mode, the bottom air chambers of the first front cell and the first rear cell are in fluid communication with the first deflation path to undergo deflation, and are isolated from the top air chamber of the first front cell. When the first deflation knob is switched to the second mode, the bottom air chamber of the first rear cell is in fluid communication with the top air chamber of the first rear cell via the first bridge tube, and the bottom air chamber of the first rear cell receives air from the air supply source and receives air from the support cell group via the air supplement tube. The second deflation knob has a third mode and a fourth mode. When the second deflation knob is switched to the third mode, the bottom air chambers of the second front cell and the second rear cell are in fluid communication with the second deflation path to undergo deflation, and are isolated from the top air chamber of the second front cell. When the second deflation knob is switched to the fourth mode, the bottom air chamber of the second rear cell is in fluid communication with the top air chamber of the second rear cell via the second bridge tube, and the bottom air chamber of the second rear cell receives air from the support cell group and the air supply source via the air supplement tube.

According to some embodiments of the present invention, a third tube, a first one-way tube and a second one-way tube are further included. The third tube is in fluid communication with the bottom air chamber of the second rear cell, the bottom air chamber of the first rear cell, the second deflation knob and the first deflation knob. The first one-way tube is in fluid communication with the top air chamber of the first rear cell and the first deflation knob, is selectively in fluid communication with the bottom air chamber of the first rear cell via the first deflation knob, and configured to only allow air in the bottom air chamber of the first rear cell to flow unidirectionally to the top air chamber. The second one-way tube is in fluid communication with the top air chamber of the second rear cell and the second deflation knob, is selectively in fluid communication with the bottom air chamber of the second rear cell via the second deflation knob, and only allows air in the bottom air chamber of the second rear cell to flow unidirectionally to the top air chamber. The first deflation knob has a first mode and a second mode. When the first deflation knob is switched to the first mode, the bottom air chambers of the first front cell and the first rear cell are in fluid communication with the first deflation path to undergo deflation, and simultaneously the bottom air chamber of the second front cell and the bottom air chamber of the second rear cell are also in fluid communication with the first deflation path to undergo deflation. When the first deflation knob is switched to the second mode, the bottom air chamber of the first rear cell is unidirectionally in fluid communication with the top air chamber of the first rear cell via the first one-way tube, and the bottom air chamber of the first rear cell receives air from the air supply source. The second deflation knob has a third mode and a fourth mode. When the second deflation knob is switched to the third mode, the bottom air chambers of the second front cell and the second rear cell are in fluid communication with the second deflation path to undergo deflation, and simultaneously the bottom air chambers of the first front cell and the first rear cell are also in fluid communication with the second deflation path to undergo deflation. When the second deflation knob is switched to the fourth mode, the bottom air chamber of the second rear cell is unidirectionally in fluid communication with the top air chamber of the second rear cell via the second one-way tube, and the bottom air chamber of the second rear cell receives air from the air supply source via the third tube.

Accordingly, the air mattress system of the present invention embodiments, while providing edge protection, features a design where the first middle cell of the first protection cell group is substantially level with or lower than the support surface. This design allows for smooth placement of drainage tubes, preventing backflow or impeded flow of fluids within the tubes. Concurrently, the bottom air chambers of the first front cell and the first rear cell in the first protection cell group can be controlled to deflate, thereby lowering the heights of these cells. This feature eliminates obstacles in the transfer path when a patient needs to be moved. Furthermore, the use of the first deflation knob to control the deflation of the bottom air chambers of the first head-side and first rear cells provides an intuitive, rapid, and convenient operation. These features collectively enhance user experience and improve the quality of medical treatment or long-term care.

BRIEF DESCRIPTION OF THE DRAWINGS

FIG. 7 is a schematic diagram of a state of operation of a first deflation knob in

FIG. 6.

DETAILED DESCRIPTION OF THE EMBODIMENTS

Objectives, features, and advantages of the present disclosure are hereunder illustrated with specific embodiments, depicted with drawings, and described below.

In the disclosure, descriptive terms such as "include, comprise, have" or other similar terms are not for merely limiting the essential elements listed in the disclosure, but can include other elements that are not explicitly listed and are however usually inherent in the components, structures, devices, portions, sections or regions.

In the disclosure, the terms similar to ordinals such as "first" or "second" described are for distinguishing or referring to associated identical or similar components or structures, and do not necessarily imply the orders of these components, structures, devices, portions, sections or regions in a spatial aspect. It should be understood that, in some situations or configurations, the ordinal terms could be interchangeably used without affecting the implementation of the present invention.

In the disclosure, descriptive terms such as "a" or "one" are used to describe the components, structures, devices, portions, sections or regions, and are for illustration purposes and providing generic meaning to the scope of the present invention. Therefore, unless otherwise explicitly specified, such description should be understood as including one or at least one, and a singular number also includes a plural number.

An air mattress system having alternating and body turning functions according to embodiments of the present invention provides functions of assisting a patient in turning and alternating between inflation and deflation. As an example, the air mattress system includes an air mattress consisting of multiple air cells and a host for inflation/deflation control of an air supply source. With independent inflation/deflation control on individual air cells, the air mattress is enabled to implement a function of lifting the body of a patient in an inclined manner and assisting body turning of the patient. Moreover, the air cells can be alternately and in turn inflated and deflated, such that a position at which the patient's body is supported by the air cells and pressure is thus generated can be continuously changed, thereby preventing long-term pressures acting on body parts of the patient from causing bedsores. The air mattress described above is applicable in facilities including hospitals, nursing homes and home long-term care to provide patients who are bedridden for an extended period of time and prone to bedsores with a comfortable sleeping environment and active protection, while at the same time reducing the burden on nursing staff or caregivers.

Figure 1:
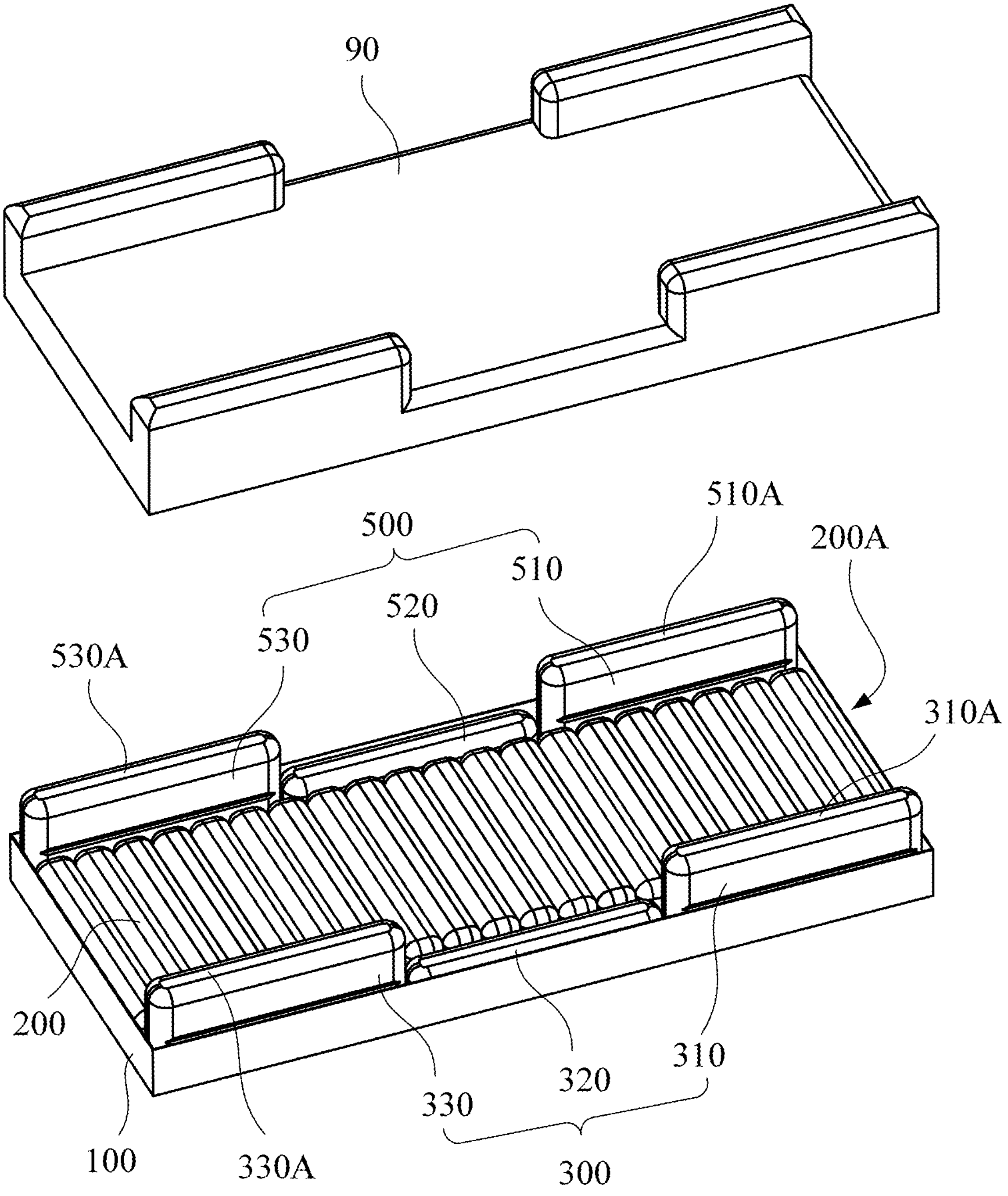
FIG. 1 is a partial exploded schematic diagram of an air mattress system according to an embodiment of the present invention.
Figure 2:
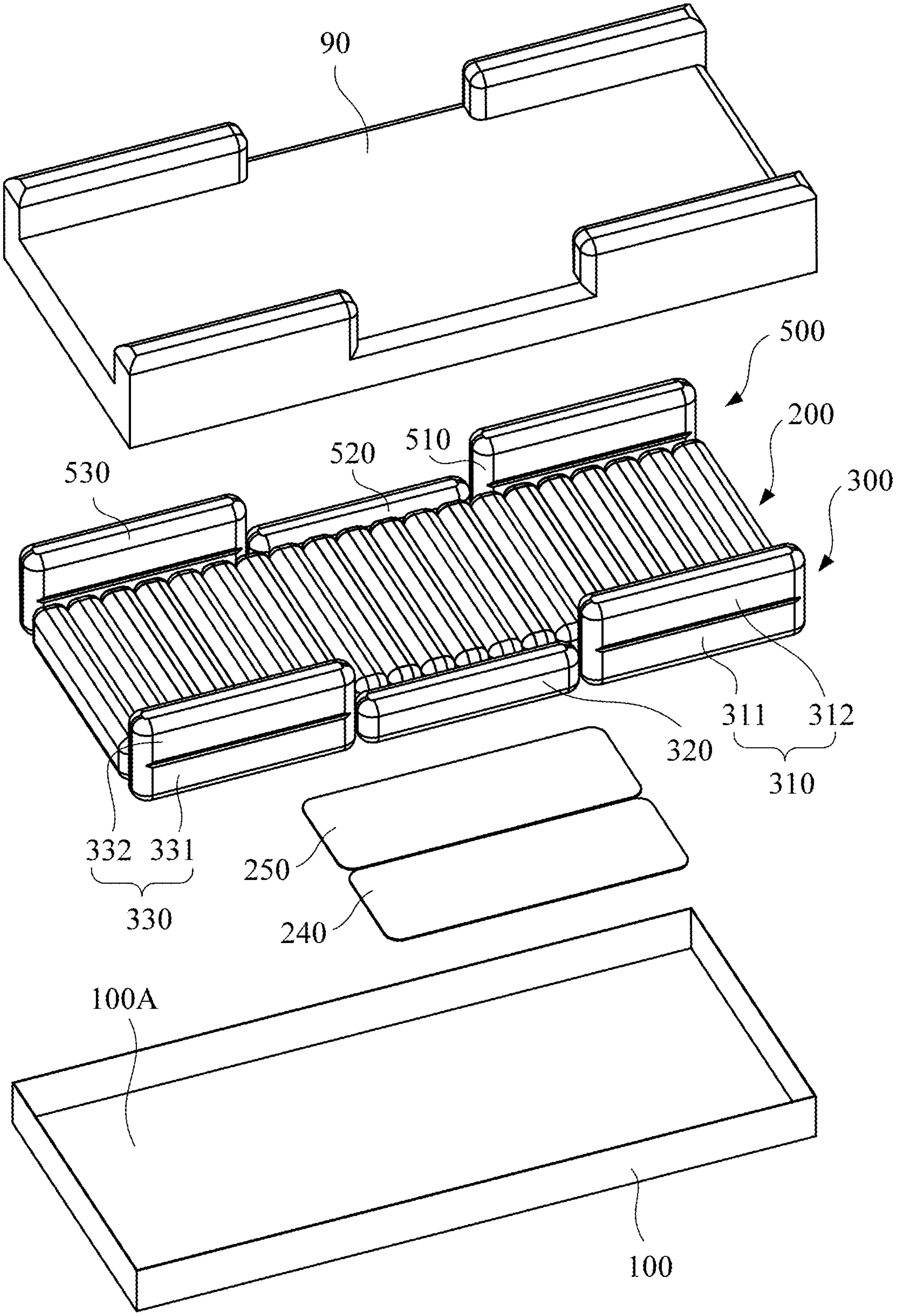
FIG. 2 is an exploded schematic diagram of the air mattress system in FIG. 1.
Figure 3:
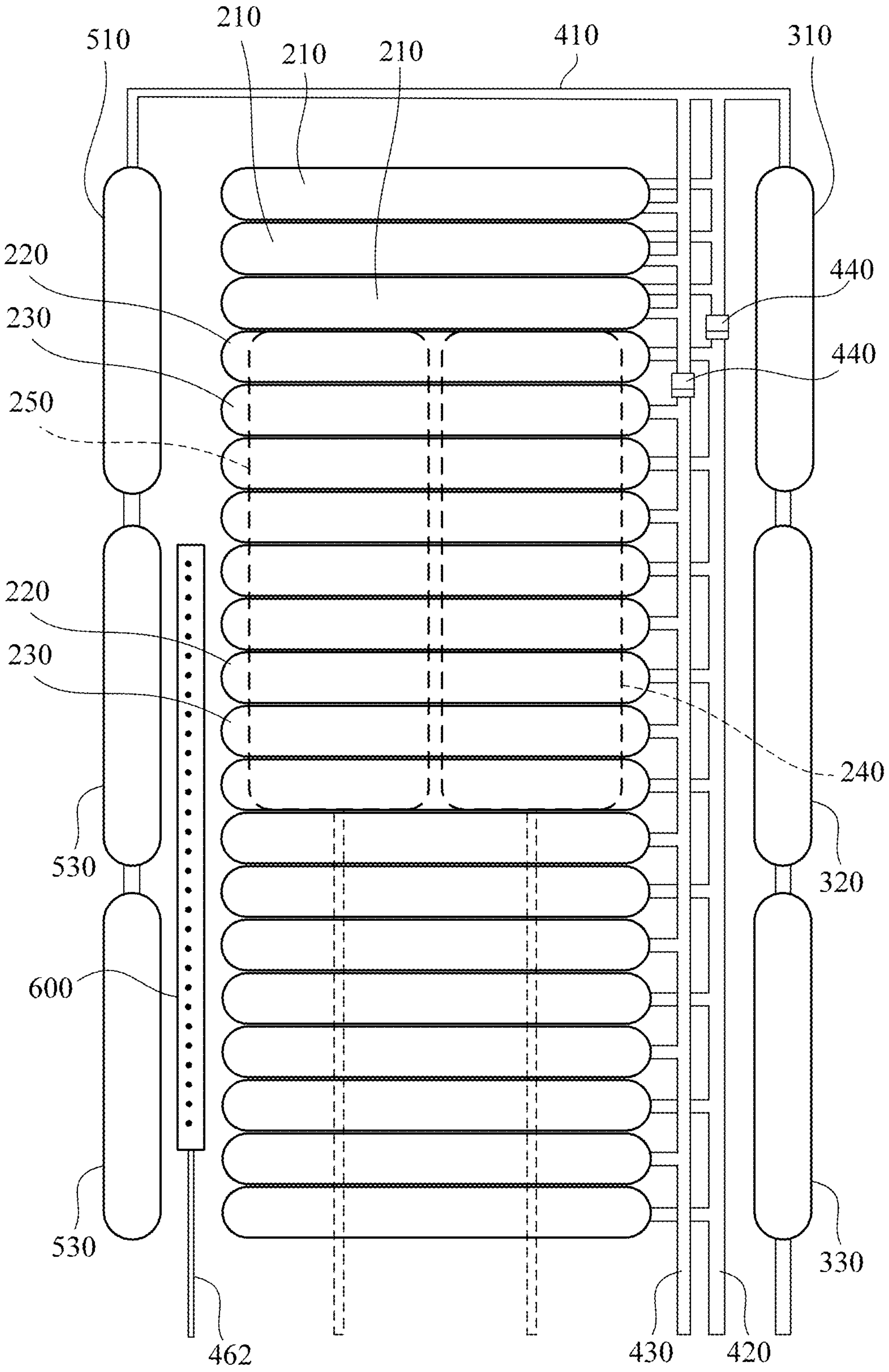
FIG. 3 is a top schematic diagram of an air mattress system according to an embodiment of the present invention.

Referring to FIG. 1, FIG. 2 and FIG. 3, FIG. 1 shows a partial exploded schematic diagram of an air mattress system according to an embodiment of the present invention, FIG. 2 shows an exploded schematic diagram of the air mattress system in FIG. 1, and FIG. 3 shows a top schematic diagram of an air mattress system according to an embodiment of the present invention. For better and clearer illustration, structures including a host (including an air supply source), pipelines, control valves and openings for the pipelines to pass through are omitted from the drawings; however, it should be understood that these structures are a part of the embodiments of the present invention.

The air mattress system of this embodiment is in fluid communication with an external air supply source, and primarily includes a bottom cover 100, a support cell group 200 and a first protection cell group 300. The bottom cover 100 is operable to carry and receive all the cell groups and pipelines. In some cases, an outer cover 90 encloses the bottom cover 100 to form an outermost layer of the air mattress that contacts the body of a patient. The bottom cover 100 has a bottom surface 100A for disposing the support cell group 200 and the first protection cell group 300. The form of the bottom cover 100 is not limited to the example shown in FIG. 2, and can also be a cover sheet or in other forms in other circumstances.

The support cell group 200 includes a plurality of air cells so as to together define a support surface 200A for a patient to lay on. As an example, the support cell group 200 of this embodiment includes a plurality of head-region air cells 210, a plurality of first alternating air cells 220 and a plurality of second alternating air cells 230 (FIG. 3). The number of the head-region air cells 210 is about 2 to 3 for supporting the head of a patient. The first alternating air cells 220 and the second alternating air cells 230 are arranged alternately to support the torso and limbs of a patient. For different body parts, the first alternating air cells 220 and the second alternating air cells 230 can be designed with different dimensions. For example, the first alternating air cells 220 and the second alternating air cells 230 in a heel region can be lower than the first alternating air cells 220 and the second alternating air cells 230 in other regions.

The support surface 200A is a surface collectively defined by tops of the head-region air cells 210, the first alternating air cells 220 and the second alternating air cells 230 of the support cell group 200 to support a patient. It should be understood that, the support surface 200A is not in direct contact with the body of a patient, but the outer cover 90 is provided between the two, so as to provide functions for easy cleaning and separation from fluids such as water, blood and dirt. Moreover, the support surface 200A correspondingly deforms along with the outer form of the air cells, reclining postures of a patient and other uses, and does not refer to only a flat surface.

As another example, the support cell group 200 may further include a left body turning air cell 240 and a right body turning air cell 250. The left body turning air cell 240 and the right body turning air cell 250 are arranged side by side below the first alternating air cells 220 and the second alternating air cells 230 in a back region. When the left body turning air cell 240 is inflated and the right body turning air cell 250 is not inflated or is deflated, the left side of the body of a patient is lifted and tilts toward the right; when the left body turning air cell 240 is not inflated or is deflated and the right body turning air cell 250 is inflated, the right side of the body of a patient is lifted and tilts toward the left.

The first protection cell group 300 is located on one side (for example, the left of a patient) of the support cell group 200, and is operable to stop the body of a patient to prevent the patient from sliding to an edge of the bed and bumping into a rigid fence or even falling off the bed when the body is turned. The first protection cell group 300 includes a first front cell 310, a first middle cell 320 and a first rear cell 330. The first middle cell 320 is arranged between the first front cell 310 and the first rear cell 330, and substantially corresponds to the position from the waist to knees of a patient during use. Moreover, the height of the first middle cell 320 is substantially not greater than a distance between the support surface 200A and the bottom surface 100A. That is to say, the first middle cell 320 is substantially leveled with the support surface 200A or lower than the support surface 200A, allowing drainage tubes or drips set up on the body of a patient to pass through and preventing poor flow or backflow of fluids in the tubes caused by undulating heights of pipelines. The heights of the first front cell 310 and the first rear cell 330 are higher than that of the first middle cell 320, providing the body of a patient with a stop function.

The position of the support surface 200A or the distance between the support surface 200A and the bottom surface 100A of the bottom cover 100 may be changed due to the degree of inflation of the air cells or whether a patient is lying thereon. However, in a state of general use, whether a patient lays on the support surface 200A or not, provided that the height of the first middle cell 320 is substantially equal to or lower than that of the support surface 200A, such is encompassed within the scope of the present invention. In this example, during the design and manufacturing of the air cells, the value of the height of the first middle cell 320 is predetermined to be substantially the same as or less than those of the first alternating air cells 220 and the second alternating air cells 230.

The first front cell 310 and the first rear cell 330 respectively have bottom air chambers 311 and 331 close to the bottom surface 100A, and the bottom air chambers 311 and 331 are in direct communication with (fluidly connected to) each other. As an example, an inside of the first front cell 310 is partitioned into a bottom air chamber 311 and a top air chamber 312 located over the bottom air chamber 311 which are isolated from each other by a separating structure (for example, a drawstring), and an inside of the first rear cell 330 is partitioned into a bottom air chamber 331 and a top air chamber 332 located over the bottom air chamber 331 which are isolated from each other by a separating structure (for example, a drawstring).

The bottom air chamber 311 of the first front cell 310 and the bottom air chamber 331 of the first rear cell 330 are in fluid communication with each other by an external pipeline, and the bottom air chamber 331 of the first rear cell 330 is fluidly connected to an external air supply source. When heights of the first front cell 310 and the first rear cell 330 need to be restored, air in one or a combination of the air supply source, the support cell group 200 and the head-region air cells 210 can be transported to the bottom air chamber 311 of the first front cell 310 and the bottom air chamber 331 of the first rear cell 330 to inflate both the first front cell 310 and the first rear cell 330.

When the bottom air chamber 311 of the first front cell 310 and the bottom air chamber 331 of the first rear cell 330 are controlled to be deflated, tops 310A and 330A of the first front cell 310 and the first rear cell 330 are substantially lowered to be near the support surface 200A, and the first middle cell 320 is not deflated in this process but still maintains its height to be substantially the same or lower than that of the support surface 200A, so as to prevent the air mattress system and a hospital bed frame from producing a gap in between. Thus, the height of the entire first protection cell group 300 is substantially the same or lower than that of the support surface 200A, so that a patient does not have to cross over an edge protection structure having a greater height when the patient is transferred or leaves the air mattress.

Accordingly, the air mattress system according to an embodiment of the present invention includes a first protection cell group 300 disposed on one side to coordinate with the primary support cell group 200 to further provide a patient with edge protection of the air mattress. In the first protection cell group 300, the first middle cell 320 having a height not exceeding that of the support surface 200A is provided, and thus smoother routing paths are preserved for medical pipelines to promote smooth flow of fluids in the pipes.

Further speaking, the head and tail sides of the first protection cell group 300 are respectively provided with the first front cell 310 and the first rear cell 330, both of which are respectively provided with the bottom air chambers 311 and 331 at the bottoms thereof. When needed, the bottom air chambers 311 and 331 can be controlled for deflation and the top air chambers 312 and 332 can be kept in an inflated state, so that the tops 310A and 330A of the bottom air chambers 311 and 331 are lowered to heights near the support surface 200A, further providing a patient with better convenience for a smoother transition during a transfer or while getting off the bed. When the transfer ends and a patient returns to a reclining state, only the previously deflated bottom air chambers 311 and 331 need to be inflated again instead of inflating the entire protection cell group again, and so the time for restoring the air mattress to a state suitable for a patient to lay on can be saved. Moreover, the first middle cell 320 as well as the top air chambers 312 and 332 which are not deflated leave no gap between the air mattress system and the hospital bed frame, hence reducing the risks of having the patient's limbs getting caught between the air mattress and the hospital bed frame or the patient falling off due to the gap.

Figure 4:
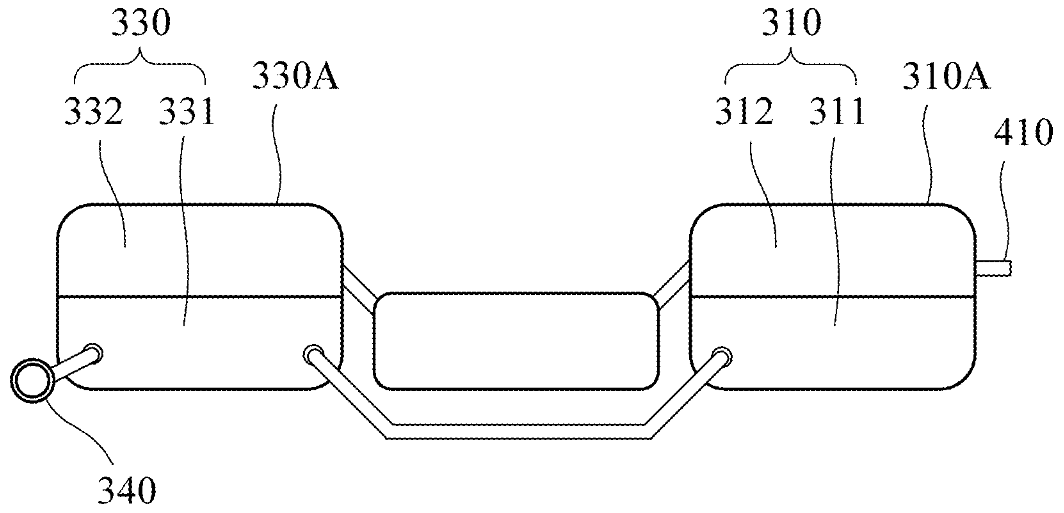
FIG. 4 is a side schematic diagram of an air mattress system according to an embodiment of the present invention.
Figure 5:
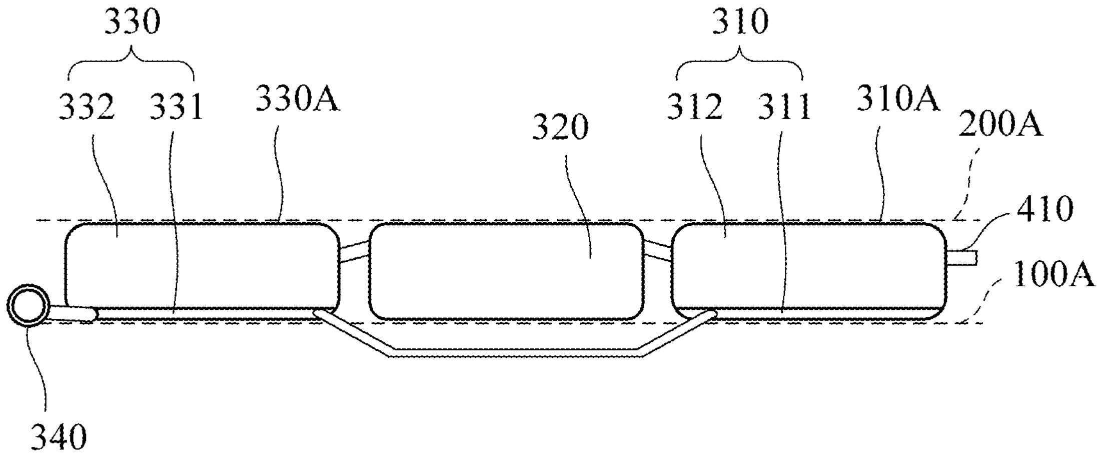
FIG. 5 is a schematic diagram of a state of use of the air mattress system in FIG. 4.

Referring to FIG. 3 to FIG. 5, FIG. 4 shows a side schematic diagram of an air mattress system according to an embodiment of the present invention, and FIG. 5 shows a schematic diagram of a state of use of the air mattress system in FIG. 4.

The air mattress system may include a first deflation knob 340, which has a first deflation path for the bottom air chamber 311 of the first front cell 310 and the bottom air chamber 331 of the first rear cell 330 to undergo deflation together. The first rear cell 330 is provided with a ventilation hole, which is in fluid communication with the bottom air chamber 331 and operable for installing pipelines. The first deflation knob 340 can be, for example, a one-in-two-out valve, installed in a pipeline connected to the bottom air chamber 331 of the first rear cell 330. When the first deflation knob 340 is switched from a closed position to an open position, the bottom air chambers 311 and 331 form a first deflation path with respect to an external environment, allowing air in the bottom air chambers 311 and 331 to be discharged.

In terms of position configuration, with arrangements of lengths, shapes and routing paths of pipelines, the first deflation knob 340 can be positioned on a side surface located on legs of the air mattress and close to a bottom edge and be exposed from a side surface of the bottom cover 100, so as to be readily switched and operated by nursing staff or caregivers.

In the first front cell 310, the bottom air chamber 311 and the top air chamber 312 can be isolated from each other by the separating structure (for example, a drawstring); in the first rear cell 330, the bottom air chamber 331 and the top air chamber 332 are isolated from each other by the separating structure (for example, a drawstring). Thus, when the bottom air chambers 311 and 331 are deflated, the top air chambers 312 and 332 are kept in an inflated state and hence heights of the air cells are maintained. The first middle cell 320, the top air chamber 312 of the first front cell 310 and the top air chamber 332 of the first rear cell 330 are connected in series and are in fluid communication with one another, and belong to the same group of routing paths. In this embodiment, the first middle cell 320, the top air chamber 312 of the first front cell 310 and the top air chamber 332 of the first rear cell 330 are connected in series and thus in fluid communication with one another by pipelines in between; however, the present invention is not limited to the example above.

The head-region air cell 210 of the support cell group 200 can be in fluid communication with the top air chamber 312 of the first front cell 310 via an air supplement tube 410. Thus, the top air chamber 312 of the first front cell 310 can receive air from the support cell group 200 via the air supplement tube 410, and this can accelerate a replenishment speed of air into the top air chamber 312 and reduce the time needed for restoring the air cells to the original inflated state. Since the first middle cell 320, the top air chamber 312 of the first front cell 310 and the top air chamber 332 of the first rear cell 330 are in fluid communication with one another, the first middle cell 320 and the top air chamber 332 of the first rear cell 330 can also receive air from the support cell group 200 via the top air chamber 312 of the first front cell 310, hence accelerating the speed of replenishing air into the corresponding bottom air chamber and reducing the time needed for restoring the air cells to the original inflated state.

In terms of pipeline routing of the air mattress system, a first tube 420 and a second tube 430 are connected to a main pipeline of the host (not shown), the first alternating air cells 220 are in fluid communication with the first tube 420 for inflation/deflation control, the second alternating air cells 230 are in fluid communication with the second tube 430 for inflation/deflation control, and the host controls air transport of the first tube 420 and the second tube 430 to perform the alternating function of the first alternating air cells 220 and the second alternating air cells 230. Each of the head-region air cells 210 can be individually in fluid communication with the first tube 420 and the second tube 430 via a one-way valve 440, so as to receive air from the first alternating air cells 220 and the second alternating air cells 230, wherein the air can be provided unidirectionally to the head-region air cells 210 from the first tube 420 and the second tube 430. Thus, each of the head-region air cells 210 can serve as an additional air supply source, that is, practicing an air supplement function using existing an in-bag pressure for other air cells which are in communication therewith and have lower pressures, so as to first supplement air into the other air cells having lower pressures before air is not yet supplemented or while air is being supplemented from the external air supply source. Accordingly, when the head-region air cells 210 need to supply air therein to other air cells (for example, supply air therein to air cells in the first protection cell group 300 and/or air cells in a second protection cell group 500 to be described shortly), the first tube 420 and the second tube 430 can serve as supply pipelines for an air supplement source. Moreover, on the basis of the configuration of the one-way valve 440, the head-region air cells 210 can be isolated from the first alternating air cells 220 and the second alternating air cells 230 alternating in a deflated state, preventing the head-region air cells 210 from supplementing air to the first alternating air cells 220 or the second alternating air cells 230 in a deflated state and hence avoiding interference with the inflation/deflation alternating function. Furthermore, the configuration above provides additional functions without increasing the number of pipelines or channels (for example, no need to provide the head-region air cells 210 with exclusive pipelines in fluid communication with the external air supply source), thereby achieving multi-functional requirements with a low-cost configuration. Moreover, with the configuration of the one-way valve 440, when the air cells in the first protection cell group 300 need to be supplemented with air, a joint air supplement mechanism formed by the first alternating air cells 220 or the second alternating air cells 230 coordinating with the head-region air cells 210 is capable of significantly improving the drawbacks of a slower air supplement speed caused by using only the external air supply source or a feeling of sinking quickly sensed in the head of a patient in a reclining posture due to fast air supplement when the air supplement is carried out by head-region air cells 210 with small volume, thereby improving adaptivity of a patient in a reclining posture.

The air mattress system can further include a second protection cell group 500. The second protection cell group 500 is disposed on the bottom surface 100A and is located on the other side (for example, the right) of the support cell group 200, so as to provide the patient with stoppage and protection on the other side. Similar to the structure of the first protection cell group 300, the second protection cell group 500 includes a second front cell 510, a second middle cell 520 and a second rear cell 530. The second middle cell 520 is arranged between the second front cell 510 and the second rear cell 530, and has a height substantially not greater than the distance between the support surface 200A and the bottom surface 100A, so as to allow drainage tubes to be moderately placed.

The second front cell 510 and the second rear cell 530 respectively have bottom air chambers 511 and 531 close to the bottom surface 100A and top air chambers 512 and 532 located over the bottom air chambers, wherein the bottom air chamber 511 of the second front cell 510 and the bottom air chamber 531 of the second rear cell 530 are in fluid communication with each other.

When the bottom air chamber 511 of the second front cell 510 and the bottom air chamber 531 of the second rear cell 530 are controlled to be deflated, tops 510A and 530A of the second front cell 510 and the second rear cell 530 are substantially lowered to be near the support surface 200A.

The top air chamber 512 of the second front cell 510 can be in fluid communication with the air supplement tube 410, and the second middle cell 520, the top air chamber 512 of the second front cell 510 and the top air chamber 532 of the second rear cell 530 are connected in series and are in fluid communication with one another, such that the second middle cell 520, the top air chamber 512 of the second front cell 510 and the top air chamber 532 of the second rear cell 530 can receive air from the head-region air cells 210 via the air supplement tube 410. Accordingly, the first middle cell 320, the top air chamber 312 of the first front cell 310, the top air chamber 332 of the first rear cell 330, the head-region air cells 210, the second middle cell 520, the top air chamber 512 of the second front cell 510 and the top air chamber 532 of the second rear cell 530 are in fluid communication with one another and form a group of routing paths.

Figure 6:
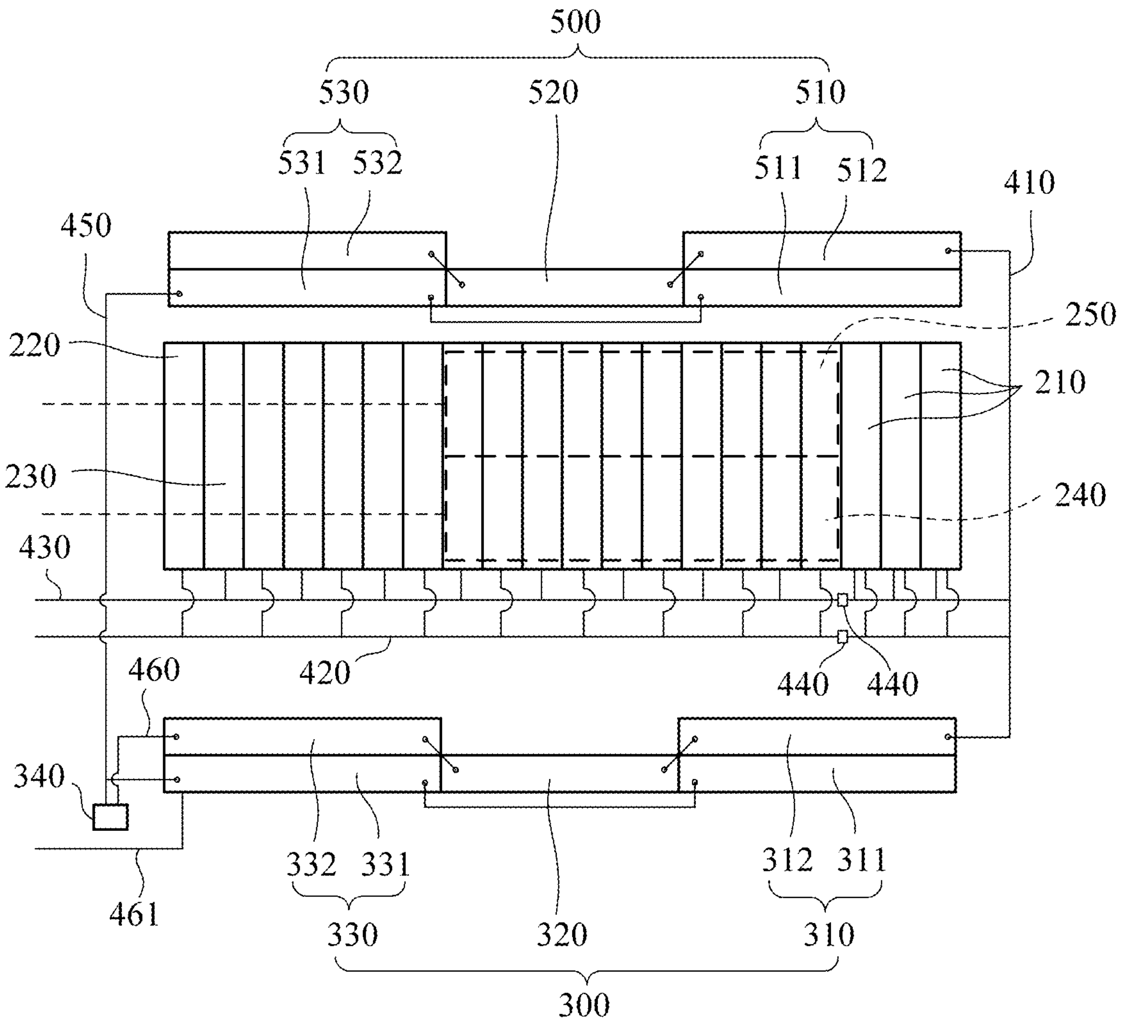
FIG. 6 is a schematic diagram of a routing pattern of an air mattress system according to an embodiment of the present invention.
Figure 7:
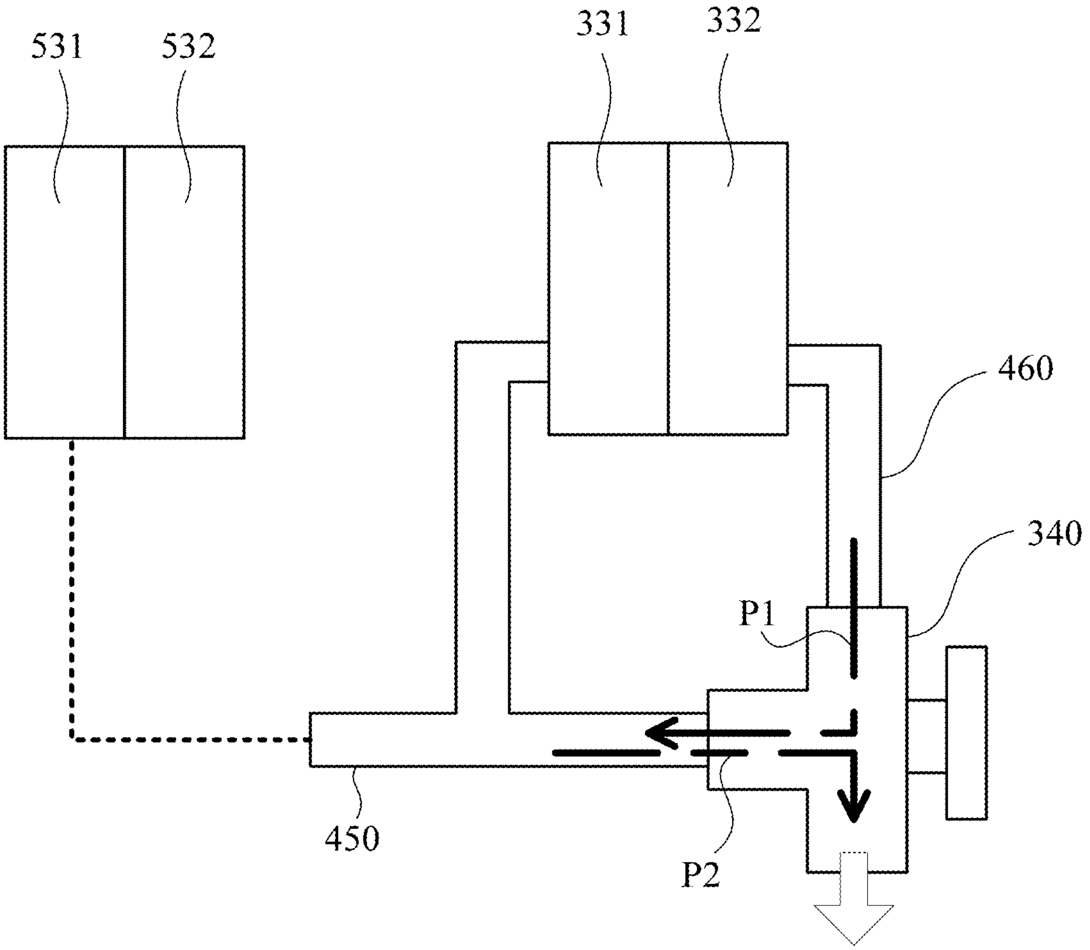

Referring to FIG. 3 to FIG. 7, FIG. 6 shows a schematic diagram of a routing pattern of an air mattress system according to an embodiment of the present invention, and FIG. 7 shows a schematic diagram of a state of operation of a first deflation knob in FIG. 6.

As shown in FIG. 6, the pipeline routing of the air mattress system includes a third tube 450 and a first bridge tube 460. The third tube 450 is in fluid communication with the bottom air chamber 531 of the second rear cell 530, the bottom air chamber 331 of the first rear cell 330 and the first deflation knob 340. The first bridge tube 460 is in fluid communication with the top air chamber 332 of the first rear cell 330 and the first deflation knob 340, and is selectively in fluid communication with the bottom air chamber 331 of the first rear cell 330 via the first deflation knob 340. More specifically, the third tube 450 can be selectively in fluid communication with the first deflation path or selectively in fluid communication with the top air chamber 332 of the first rear cell 330 via the first deflation knob 340.

The third tube 450 may be equipped with a pressure sensor (not shown) to detect internal pressures of the bottom air chamber 331 of the first rear cell 330 of the first protection cell group 300 and the bottom air chamber 531 of the second rear cell 530 of the second protection cell group 500, thereby reducing the occurrence of operation accidents caused by, for example, improper turning off or unintentional turning on of the first deflation knob 340.

As shown in FIG. 7, the first deflation knob 340 can have a first mode and a second mode, and is, for example, a one-in-two-out valve.

When the first deflation knob 340 is switched to the first mode, the bottom air chamber 311 of the first front cell 310, the bottom air chamber 331 of the first rear cell 330, the bottom air chamber 511 of the second front cell 510 and the bottom air chamber 531 of the second rear cell 530 are in fluid communication with one another, and are further together in fluid communication with the first deflation path formed on the basis of a fluid path P2 between the third tube 450 and the first deflation knob 340 for further deflation. At this point in time, the third tube 450 and the first bridge tube 460 are isolated from each other. After deflation, the heights of the first front cell 310, the first rear cell 330, the second front cell 510 and the second rear cell 530 can be lowered to be leveled with or lower than that of the support surface 200A. That is, the stoppage and protection functions of the first protection cell group 300 and the second protection cell group 500 located on the left and right sides of a patient are simultaneously released, so as to reduce obstructions during transfer of a patient. When the first deflation knob 340 is switched to the first mode, since the third tube 450 and the first bridge tube 460 are isolated from each other, the bottom air chamber 331 and the top air chamber 332 of the first rear cell 330 are not in fluid communication with each other, and thus air in the air cells of the top air chamber 332 is not deflated altogether.

When the first deflation rotary know 340 is switched to the second mode, the bottom air chamber 331 of the first rear cell 330 is in fluid communication with the first bridge tube 460 via the third tube 450 and the first deflation knob 340; that is, a path P1 formed between the first bridge tube 460, the first deflation knob 340 and the third tube 450 is in communication, such that the bottom air chamber 331 of the first rear cell 330 and the top air chamber 332 of the first rear cell 330 can be in fluid communication with each other, and are not altogether deflated as being isolated from the first deflation path. With such configuration, the bottom air chamber 331 of the first rear cell 330 can receive air from the air supply source (for example, via a tube 461 in fluid communication with the bottom air chamber 331) and receive air from the support cell group 200 via the air supplement tube 410. Since the bottom air chamber 311 of the first front cell 310 and the bottom air chamber 331 of the first rear cell 330 are in fluid communication with each other, the bottom air chamber 311 of the first front cell 310 can also be supplemented with air. Since the bottom air chamber 531 of the second rear cell 530 is in fluid communication with the first deflation knob 340 in the path P1 via the third tube 450, the bottom air chamber 531 of the second rear cell 530 can also be in fluid communication with the bottom air chamber 331 of the first rear cell 330. Moreover, the bottom air chamber 511 of the second front cell 510 in fluid communication with the bottom air chamber 531 of the second rear cell 530 can also receive air from the bottom air chamber 331 of the first rear cell 330 via the third tube 450. More specifically, since the bottom air chamber 531 of the second rear cell 530 and the bottom air chamber 511 of the second front cell 510 are isolated from the top air chamber 532 of the second rear cell 530, the top air chamber 512 of the second front cell 510 and the second middle cell 520 and are not at all in any communication, they can receive only air from the support cell group 200 via the first bridge tube 460 and receive air from the air supply source via the third tube 450 (for example, via the tube 461 in fluid communication with the bottom air chamber 331). That is, the bottom air chamber 531 of the second rear cell 530 and the bottom air chamber 511 of the second front cell 510 are still entitled to the effect of an accelerated air replenishment speed. Meanwhile, with the configuration of directly supplying air to the bottom air chamber 331 by the external air source, pressure conditions inside the air cells of the edge protection structures on the two sides can be simultaneously monitored by using only one sensor.

Referring to FIG. 3, in this implementation, only five channels, including the first tube 420, the second tube 430, a pipeline controlling the left body turning air cell 240, a pipeline controlling the right body turning air cell 250 and the tube 461, serve as air channels in fluid communication with the air supply source and having access to the air supply source. If a low air loss air cell 600 providing a heat dissipation effect is additionally configured, only a low air loss tube 462 in fluid communication with the micro-leakage air cell 600 needs to be provided, and this increases only one channel for such use. That is to say, only a total number of six channels are needed to achieve enriched air mattress functions, and this helps in reducing restrictions on an air supply source host that can be used with such air mattress system and helps in reducing costs of the overall air mattress system.

Referring to FIG. 3 to FIG. 5 and FIG. 8, FIG. 8 shows a schematic diagram of a routing pattern of an air mattress system according to another embodiment of the present invention.

The air mattress system can include the first deflation knob 340 and a second deflation knob 540. The first deflation knob 340 correspondingly controls deflation of the bottom air chambers 311 and 331 of the first protection cell group 300, and the second deflation knob 540 correspondingly controls deflation of the bottom air chambers 511 and 531 of the second protection cell group 500.

The second deflation knob 540 has a second deflation path for the bottom air chamber 511 of the second front cell 510 and the bottom air chamber 531 of the second rear cell 530 to simultaneously deflate. The second rear cell 530 is provided with a ventilation hole, which is in fluid communication with the bottom air chamber 531 and operable for installing pipelines. The second deflation knob 540 can be, for example, a one-in-two-out valve, and is installed in a pipeline connected to the bottom air chamber 531 of the second rear cell 530. When the second deflation knob 540 is switched from a closed position to an open position, the bottom air chambers 511 and 531 form a second deflation path with respect to an external environment, allowing air in the bottom air chambers 511 and 531 to be discharged. On the other hand, when the second deflation knob 540 is switched to the closed position, the bottom air chamber 531 of the second rear cell 530 is allowed to be in communication only with the top air chamber 532 but does not become in communication for a second deflation path.

Figure 8:
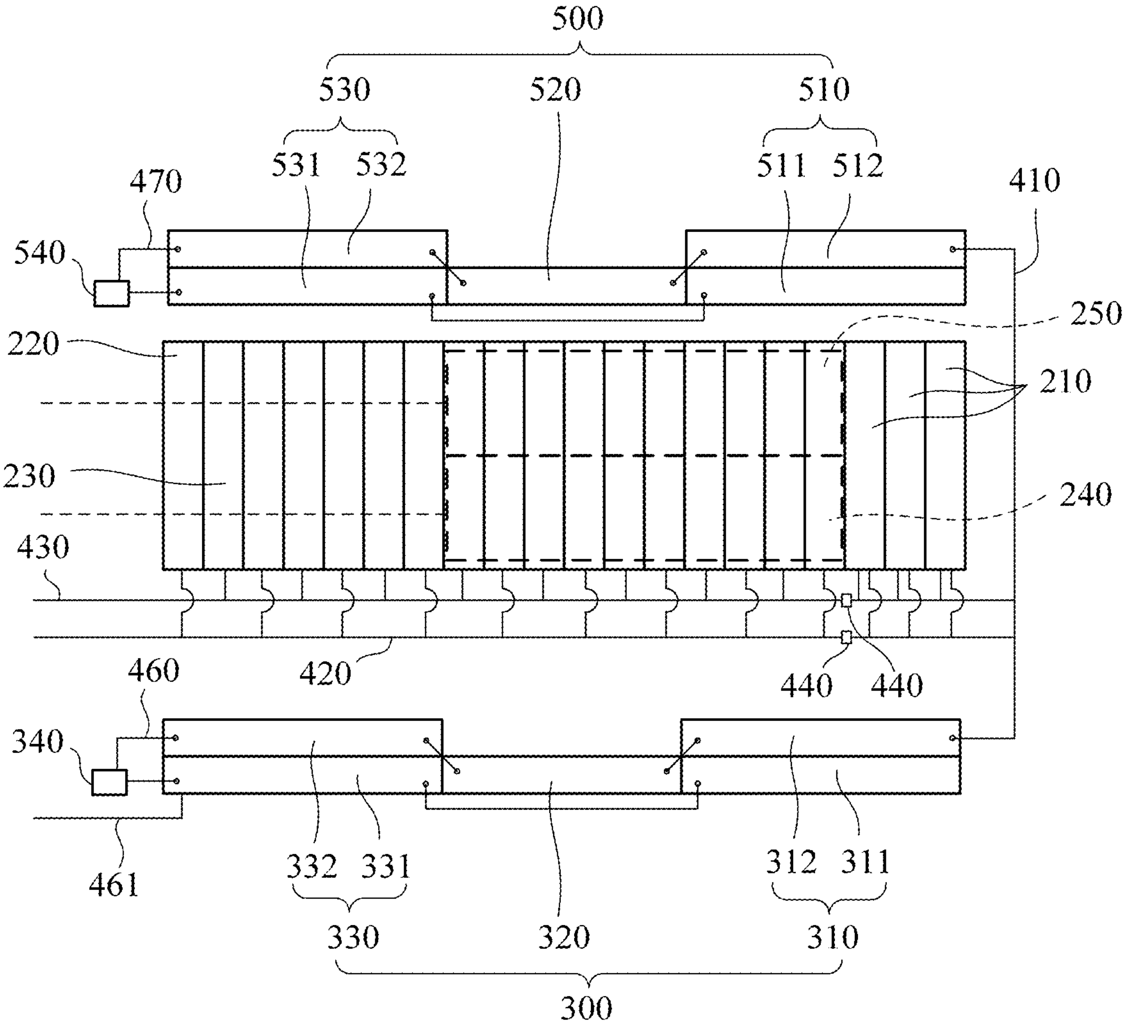
FIG. 8 is a schematic diagram of a routing pattern of an air mattress system according to another embodiment of the present invention.

As shown in FIG. 8, the pipeline routing of the air mattress system includes the first bridge tube 460 and a second bridge tube 470. The first bridge tube 460 is in fluid communication with the top air chamber 332 of the first rear cell 330 and the first deflation knob 340, and is selectively in fluid communication with the bottom air chamber 331 of the first rear cell 330 via the first deflation knob 340; that is, communicating the top air chamber 332 with the bottom air chamber 331, or communicating the top air chamber 332 with the first deflation path. The second bridge tube 470 is in fluid communication with the top air chamber 532 of the second rear cell 530 and the second deflation knob 540, and is selectively in fluid communication with the bottom air chamber 531 of the second rear cell 530 via the second deflation knob 540; that is, communicating the top air chamber 532 with the bottom air chamber 531, or communicating the top air chamber 532 with the second deflation path.

The first deflation knob 340 has a first mode and a second mode. When the first deflation knob 340 is switched to the first mode, the bottom air chamber 311 of the first front cell 310 and the bottom air chamber 331 of the first rear cell 330 are in fluid communication with the first deflation path to undergo deflation, and are isolated from the top air chamber 312 of the first front cell 310, the top air chamber 332 of the first rear cell 330 and the first middle cell 320. At this point in time, only the heights of the first front cell 310 and the first rear cell 330 of the first protection cell group 300 are lowered for a patient to be transferred or get off the bed from the side of the first protection cell group 300.

When the first deflation knob 340 is switched to the second mode (and the second deflation knob 540 is switched to a fourth mode), the bottom air chamber 331 of the first rear cell 330 is in fluid communication with the top air chamber 332 of the first rear cell 330 via the first bridge tube 460, and is isolated from the first deflation path. Moreover, the bottom air chamber 331 of the first rear cell 330 can receive air from the air supply source (for example, via the tube 461 in fluid communication with the bottom air chamber 331) and receive air from the support cell group 200 via the air supplement tube 410. Since the bottom air chamber 331 of the first rear cell 330 and the bottom air chamber 311 of the first front cell 310 are in fluid communication with each other, the bottom air chamber 311 of the first front cell 310 can also be supplemented with air, further restoring the heights of the first front cell 310 and the first rear cell 330 of the first protection cell group 300 to a state of being higher than that of the support surface 200A.

The second deflation knob 540 has a third mode and a fourth mode. When the second deflation knob 540 is switched to the third mode, the bottom air chamber 511 of the second front cell 510 and the bottom air chamber 531 of the second rear cell 530 are in fluid communication with the second deflation path to undergo deflation, and are isolated from the top air chamber 512 of the second front cell 510. At this point in time, only the heights of the second front cell 510 and the second rear cell 530 of the second protection cell group 500 are lowered for a patient to be transferred or get off the bed from the side of the second protection cell group 500.

When the second deflation knob 540 is switched to the fourth mode (and the first deflation knob 340 is switched to the second mode), the bottom air chamber 531 of the second rear cell 530 is in fluid communication with the top air chamber 532 of the second rear cell 530 via the second bridge tube 470, and the bottom air chamber 531 of the second rear cell 530 receives air from the support cell group 200 via the air supplement tube 410 and receives air from the air supply source (referring to air provided to the bottom air chamber 311 via the tube 461 in fluid communication with the bottom air chamber 331). Since the bottom air chamber 531 of the second rear cell 530 and the bottom air chamber 511 of the second front cell 510 are in fluid communication with each other, the bottom air chamber 511 of the second front cell 510 can also be supplemented with air, further restoring the heights of the second front cell 510 and the second rear cell 530 of the second protection cell group 500 to a state of being higher than that of the support surface 200A.

In this implementation, the bottom air chamber 331 of the first rear cell 330 can be selectively in fluid communication with the top air chamber 332 of the first rear cell 330 via the first bridge tube 460 and the first deflation knob 340, and the bottom air chamber 531 of the second rear cell 530 can be selectively in fluid communication with the top air chamber

532 of the second rear cell 530 via the second bridge tube 470 and the second deflation knob 540. Thus, when the bottom air chambers 331 and 531 need to be inflated to restore their heights, air from the support cell group 200 and the air supply source can be simultaneously received, hence accelerating the time for restoring the air mattress to a state suitable for a patient to lay on. Moreover, in this implementation, only five channels serving as air channels in fluid communication with the air supply source and having access to the air supply source are needed. If a low air loss tube 462 is to be provided, only one additional channel is needed for such use. That is to say, only a total number of six channels are needed to achieve enriched air mattress functions, and this helps in reducing restrictions on an air supply source host that can be used with such air mattress system and helps in reducing the overall cost of the air mattress system.

Referring to FIG. 3 to FIG. 5 and FIG. 9, FIG. 9 shows a schematic diagram of a routing pattern of an air mattress system according to yet another embodiment of the present invention.

The air mattress system can include the first deflation knob 340 and the second deflation knob 540. Either one of the first deflation knob 340 and the second deflation knob 540 can control deflation of the bottom air chambers 311 and 331 of the first protection cell group 300 and deflation of the bottom air chambers 511 and 531 of the second protection cell group 500. The details of the first deflation knob 340 and the second deflation knob 540 and respective connecting means with the corresponding bottom air chambers 311 and 511 are substantially the same as those provided in the description of the foregoing embodiments.

Figure 9:
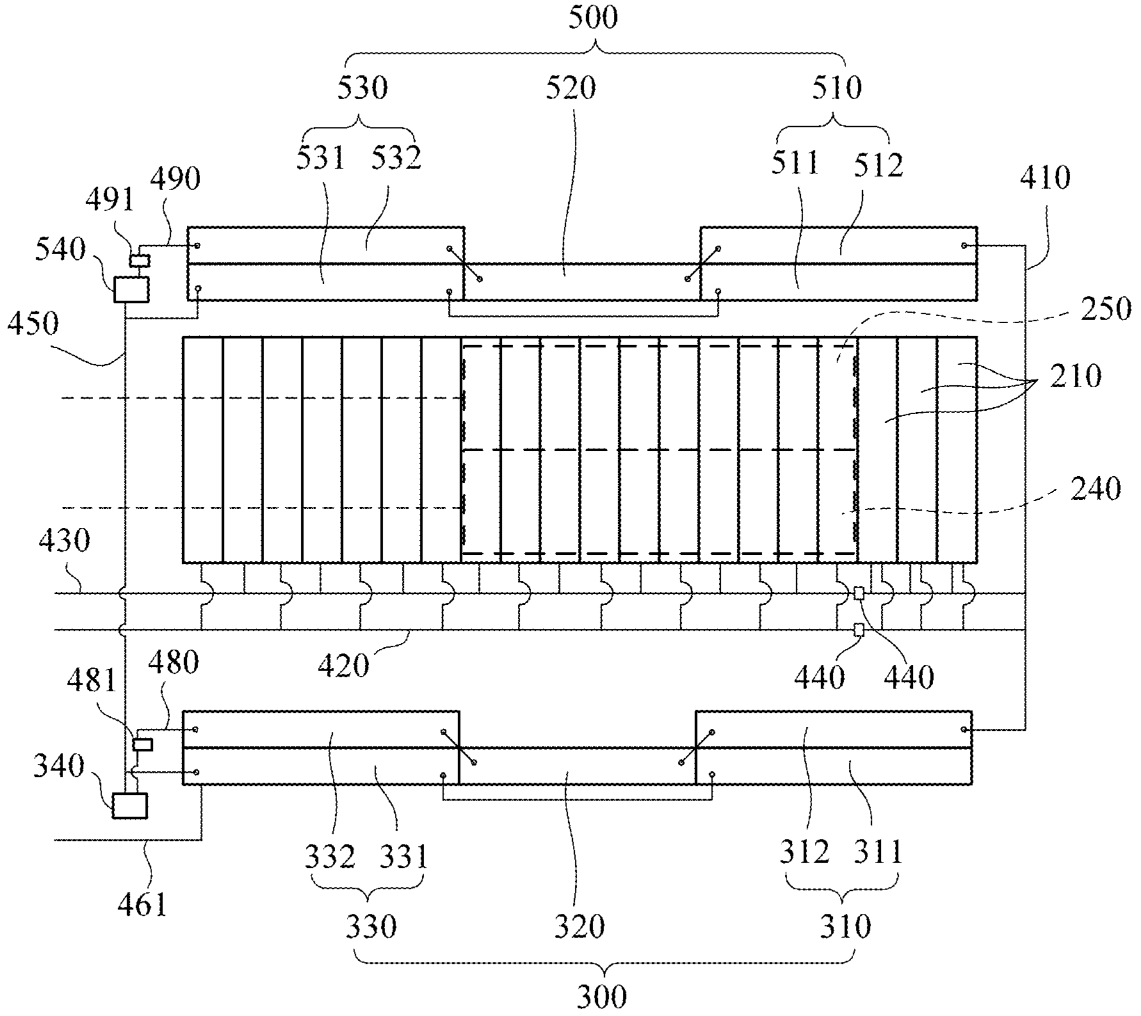
FIG. 9 is a schematic diagram of a routing pattern of an air mattress system according to yet another embodiment of the present invention.

As shown in FIG. 9, the pipeline routing of the air mattress system includes the third tube 450, a first one-way tube 480 (coordinating with a one-way valve 481) and a second one-way tube 490 (coordinating with a one-way valve 491).

The third tube 450 is in fluid communication with the bottom air chamber 531 of the second rear cell 530, the bottom air chamber 331 of the first rear cell 330, the second deflation knob 540 and the first deflation knob 340. The first one-way tube 480 is in fluid communication with the top air chamber 332 of the first rear cell 330 and the first deflation knob 340, is selectively in fluid communication with the bottom air chamber 331 of the first rear cell 330 via the first deflation knob 340, and allows only air in the bottom air chamber 331 of the first rear cell 330 to flow unidirectionally to the top air chamber 332. The second one-way tube 490 is in fluid communication with the top air chamber 532 of the second rear cell 530 and the second deflation knob 540, is selectively in fluid communication with the bottom air chamber 531 of the second rear cell 530 via the second deflation knob 540, and allows only air in the bottom air chamber 531 of the second rear cell 530 to flow unidirectionally to the top air chamber 532.

The first deflation knob 340 has a first mode and a second mode. When the first deflation knob 340 is switched to the first mode, the bottom air chamber 311 of the first front cell 310 and the bottom air chamber 331 of the first rear cell 330 are in fluid communication with the first deflation path to undergo deflation. Meanwhile, even if the second deflation knob 540 is switched to the fourth mode (not in fluid communication with the second deflation path), the bottom air chamber 511 of the second front cell 510 and the bottom air chamber 531 of the second rear cell 530 are also in fluid communication with the first deflation path via the third tube 450 and are deflated. This is beneficial for an operator to readily perform operation for activating or deactivating deflation regardless of whether the operator is located on the left or the right of the air mattress, without having to especially move to the side in need of deflation. Moreover, since the third tube 450 is in fluid communication with the bottom air chamber 531 of the second rear cell 530 and the bottom air chamber 331 of the first rear cell 330, pressure conditions inside the air cells of the edge protection structures on the two sides can be simultaneously monitored by using only one sensor (for example, arranged in a channel for an air supply source host to be in fluid communication with the tube 461).

When the first deflation knob 340 is switched to the second mode, the bottom air chamber 331 of the first rear cell 330 is unidirectionally in fluid communication with the top air chamber 332 of the first rear cell 330 via the first one-way tube 480, and is isolated from the first deflation path, and the bottom air chamber 331 of the first rear cell 330 receives air from the air supply source (for example, via the tube 461 in fluid communication with the bottom air chamber 331).

The second deflation knob 540 has a third mode and a fourth mode. When the second deflation knob 540 is switched to the third mode, the bottom air chamber 511 of the second front cell 510 and the bottom air chamber 531 of the second rear cell 530 are in fluid communication with the second deflation path to undergo deflation. Meanwhile, even if the first deflation knob 340 is switched to the second mode (not in fluid communication with the first deflation path), the bottom air chamber 311 of the first front cell 310 and the bottom air chamber 331 of the first rear cell 330 are also in fluid communication with the second deflation path via the third tube 450 and are deflated. This is beneficial for an operator to readily perform operation for activating or deactivating deflation regardless of whether the operator is located on the left or the right of the air mattress, without having to especially move to the side in need of deflation.

When the second deflation knob 540 is switched to the fourth mode, the bottom air chamber 531 of the second rear cell 530 is unidirectionally in fluid communication with the top air chamber 532 of the second rear cell 530 via the second one-way tube 490, and is isolated from the second deflation path, and the bottom air chamber 531 of the second rear cell 530 receives air from the air supply source via the third tube 450 (for example, via the tube 461 in fluid communication with the bottom air chamber 331).

In this implementation, either one of the first deflation knob 340 and the second deflation knob 540 can be operated to control the bottom air chambers 311 and 331 of the first protection cell group 300 as well as the bottom air chambers 511 and 531 of the second protection cell group 500 to undergo deflation together, simplifying operation steps and providing nursing staff and caregivers with better convenience.

While providing the function of edge protection, with the design of the first middle cell of the first protection cell group substantially leveled with or lower than the support surface, the air mattress system according to the embodiments of the present invention enables drainage tubes passing through to be placed moderately, and prevents backflow or obstructed flow of fluids in the tubes. At the same time, the bottom air chambers of the first front cell and the first rear cell of the first protection cell group can be controlled and be deflated so as to lower the heights of the first front cell and the first rear cell, thereby preventing obstructions in a transfer path when a patient needs to be transferred. Moreover, by controlling the bottom air chambers of the first front cell and the first rear cell to undergo deflation by the first deflation knob, operations are made intuitive, fast and convenient, further improving user experience and enhancing the quality of medical treatment or long-term care.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. An air mattress system with alternating and body turning functions, operable to be in fluid communication with an external air supply source, the air mattress system comprising:
- a bottom cover, having a bottom surface;
- a support cell group, disposed on the bottom surface, the support cell group comprising a plurality of air cells collectively defining a support surface for a patient to lay on; and
- a first protection cell group, disposed on the bottom surface and located on one side of the support cell group, the first protection cell group comprising a first front cell, a first middle cell and a first rear cell, each disposed on the bottom surface, the first middle cell arranged between the first front cell and the first rear cell and having a height substantially not greater than a distance between the support surface and the bottom surface, each of the first front cell and the first rear cell having a bottom air chamber positioned adjacent to the bottom surface, wherein the bottom air chamber of the first front cell and the bottom air chamber of the first rear cell are in direct fluid communication with each other;
- wherein when the bottom air chamber of the first front cell and the bottom air chamber of the first rear cell are deflated, an upper surface of the first front cell and an upper surface of the first rear cell are substantially lowered to a position at or below a height of the support surface, and the first middle cell remains inflated such that the first middle cell maintains a height substantially level with or lower than the support surface.

2. The air mattress system according to claim 1, further comprising:
- a first deflation knob, having a first deflation path for the bottom air chamber of the first front cell and the bottom air chamber of the first rear cell to simultaneously deflate.

3. The air mattress system according to claim 2, wherein each of the first front cell and the first rear cell has a top air chamber located over the bottom air chamber.

4. The air mattress system according to claim 3, wherein the first middle cell, the top air chamber of the first front cell and the top air chamber of the first rear cell are connected in series and are in fluid communication with each other.

5. The air mattress system according to claim 4, wherein the support cell group comprises a plurality of head-region air cells, a plurality of first alternating air cells and a plurality of second alternating air cells, the first alternating air cells and the second alternating air cells are arranged alternately, and the head-region air cells are in fluid communication with the top air chamber of the first front cell via an air supplement tube, wherein the top air chamber of the first front cell is operable to receive air from the support cell group via the air supplement tube.

6. The air mattress system according to claim 5, wherein the first alternating air cells are in fluid communication with a first tube for inflation/deflation control, the second alternating air cells are in fluid communication with a second tube for inflation/deflation control, and each of the head-region air cells is separately in fluid communication with the first tube and the second tube via a one-way valve so as to receive air from the first alternating air cells and the second alternating air cells.

7. The air mattress system according to claim 6, further comprising:
- a second protection cell group, disposed on the bottom surface and located on the other side of the support cell group, the second protection cell group comprising a second front cell, a second middle cell and a second rear cell, the second middle cell arranged between the second front cell and the second rear cell and having a height substantially not greater than the distance between the support surface and the bottom surface, each of the second front cell and the second rear cell having a bottom air chamber positioned adjacent to the bottom surface and a top air chamber located above the bottom air chamber, and the bottom air chambers of the second front cell and the second rear cell being in direct fluid communication with each other;
- wherein when the bottom air chambers of the second front cell and the second rear cell are deflated, an upper surface of the second front cell and an upper surface of the second rear cell are substantially lowered to a position at or below a height of the support surface,
- wherein the top air chamber of the second front cell is in fluid communication with the air supplement tube.

8. The air mattress system according to claim 7, wherein the second middle cell, the top air chamber of the second front cell and the top air chamber of the second rear cell are connected in series and are in fluid communication with each other.

9. The air mattress system according to claim 8, further comprising:
- a third tube, in fluid communication with the bottom air chamber of the second rear cell, the bottom air chamber of the first rear cell and the first deflation knob; and
- a first bridge tube, in fluid communication with the top air chamber of the first rear cell and the first deflation knob, and selectively in fluid communication with the bottom air chamber of the first rear cell via the first deflation knob,
- wherein the first deflation knob has a first mode and a second mode, and when the first deflation knob is switched to the first mode, the bottom air chamber of the first front cell, the bottom air chamber of the first rear cell, the bottom air chamber of the second front cell and the bottom air chamber of the second rear cell are together in fluid communication with the first deflation path and are deflated,
- wherein when the first deflation knob is switched to the second mode, the bottom air chamber of the first rear cell is in fluid communication with the top air chamber of the first rear cell via the first bridge tube, and the bottom air chamber of the first rear cell receives air from the air supply source and air from the support cell group via the air supplement tube.

10. The air mattress system according to claim 8, further comprising:

a second deflation knob, having a second deflation path for the bottom air chamber of the second front cell and the bottom air chamber of the second rear cell to simultaneously deflate.

11. The air mattress system according to claim 10, further comprising:

a first bridge tube, in fluid communication with the top air chamber of the first rear cell and the first deflation knob, and selectively in fluid communication with the bottom air chamber of the first rear cell via the first deflation knob; and a second bridge tube, in fluid communication with the top air chamber of the second rear cell and the second deflation knob, and selectively in fluid communication with the bottom air chamber of the second rear cell via the second deflation knob, wherein the air supplement tube is further in fluid communication with the top air chamber of the second front cell such that the top air chamber of the second front cell receives air from the support cell group via the air supplement tube, wherein the first deflation knob has a first mode and a second mode, and when the first deflation knob is switched to the first mode, the bottom air chamber of the first front cell and the bottom air chamber of the first rear cell are together in fluid communication with the first deflation path to undergo deflation and are isolated from the top air chamber of the first front cell, wherein when the first deflation knob is switched to the second mode, the bottom air chamber of the first rear cell is in fluid communication with the top air chamber of the first rear cell via the first bridge tube, and the bottom air chamber of the first rear cell receives air from the air supply source and receives air from the support cell group via the air supplement tube, wherein the second deflation knob has a third mode and a fourth mode, and when the second deflation knob is switched to the third mode, the bottom air chamber of the second front cell and the bottom air chamber of the second rear cell are in fluid communication with the second deflation path to undergo deflation and are isolated from the top air chamber of the second front cell, wherein when the second deflation knob is switched to the fourth mode, the bottom air chamber of the second rear cell is in fluid communication with the top air chamber of the second rear cell via the second bridge tube, and the bottom air chamber of the second rear cell receives air from the support cell group and air from the air supply source via the air supplement tube.

12. The air mattress system according to claim 10, further comprising:

a third tube, in fluid communication with the bottom air chamber of the second rear cell, the bottom air chamber of the first rear cell, the second deflation knob and the first deflation knob;

a first one-way tube, in fluid communication with the top air chamber of the first rear cell and the first deflation knob, the first one-way tube selectively in fluid communication with the bottom air chamber of the first rear cell via the first deflation knob and configured to only allow air in the bottom air chamber of the first rear cell to flow unidirectionally to the top air chamber; and a second one-way tube, in fluid communication with the top air chamber of the second rear cell and the second deflation knob, the second one-way tube selectively in fluid communication with the bottom air chamber of the second rear cell via the second deflation knob and only allowing air in the bottom air chamber of the second rear cell to flow unidirectionally to the top air chamber;

wherein the first deflation knob has a first mode and a second mode, and when the first deflation knob is switched to the first mode, the bottom air chamber of the first front cell and the bottom air chamber of the first rear cell are in fluid communication with the first deflation path to undergo deflation, and simultaneously the bottom air chamber of the second front cell and the bottom air chamber of the second rear cell are also in fluid communication with the first deflation path to undergo deflation, wherein when the first deflation knob is switched to the second mode, the bottom air chamber of the first rear cell is unidirectionally in fluid communication with the top air chamber of the first rear cell via the first one-way tube, and the bottom air chamber of the first rear cell receives air from the air supply source, wherein the second deflation knob has a third mode and a fourth mode, and when the second deflation knob is switched to the third mode, the bottom air chamber of the second front cell and the bottom air chamber of the second rear cell are in fluid communication with the second deflation path to undergo deflation, and simultaneously the bottom air chamber of the first front cell and the bottom air chamber of the first rear cell are also in fluid communication with the second deflation path to undergo deflation, wherein when the second deflation knob is switched to the fourth mode, the bottom air chamber of the second rear cell is unidirectionally in fluid communication with the top air chamber of the second rear cell via the second one-way tube, and the bottom air chamber of the second rear cell receives air from the air supply source via the third tube.

* * * * *